AUTOMATIC ASSEMBLY APPARATUS

Filed Sept. 9, 1954

5 Sheets-Sheet 1

INVENTORS.
Carl F. Carlzen
BY William L. Lehner
Mason, Kolehmainen, Rathburn, and Wyss Attys.

INVENTORS.
Carl F. Carlzen
BY William L. Lehner
Mason, Kolehmainen,
Rathburn and Wyss Attys.

AUTOMATIC ASSEMBLY APPARATUS

Filed Sept. 9, 1954

INVENTORS.
Carl F. Carlzen
BY William L. Zehner
Mason, Kolehmainen,
Rathburn and Wyss Attys.

INVENTORS.
Carl F. Carlzen
BY William L. Lehner
Mason, Kolehmainen,
Rathburn and Wyss Attys.

INVENTORS.
Carl F. Carlzen
BY William L. Lehner
Mason, Kolehmainen,
Rathburn and Wyss Attys.

United States Patent Office 2,873,513

Patented Feb. 17, 1959

2,873,513

AUTOMATIC ASSEMBLY APPARATUS

Carl F. Carlzen, Buffalo, and William L. Lehner, Snyder, N. Y., assignors to Sylvania Electric Products, Inc., a corporation of Massachusetts Application September 9, 1954, Serial No. 454,964

7 Claims. (Cl. 29—203)

This invention relates to automatic assembly apparatus, more particularly to apparatus for automatically transferring from station to station and for automatically positioning and locking in accurately positioned relation at each station articles upon which predetermined automatic operations are to be performed at the various stations, and the invention has for an object the provision of simple reliable and fully automatic transfer apparatus of this character.

The mechanization of factories and particularly the mechanization of production lines which presently require the performance of numerous and precise manual operations has recently become of increasing importance because of the necessity of reducing costs while maintaining or even improving quality, and numerous proposals have been advanced and are being advanced looking toward the provision of automatic machinery for completely or at least partially mechanizing such production lines.

This is particularly true in connection with the manufacture of various types of electronic apparatus such, for example, as radio and television receivers, automatic fire control or flight control components and the like in which a large number of components, i. e., resistors, condensers, tube sockets, transformers and the like must be assembled on a base or panel and connected together in the desired circuit relationships.

With the advent of improvements in so-called printed circuit techniques it has been found advantageous, where permitted, by the circuitry, to print or otherwise suitably form the circuit connections on one side of an insulating baseboard or panel and to mount the various components on the opposite side of the baseboard with appropriate connection leads therefrom extending through the baseboard and electrically connected to the printed circuitry. One of the problems that arises in connection with the automatic assembly of various components of the type above-indicated on a baseboard or panel resides in the provision of means for automatically transferring the baseboards from one station to the next in timed relation to the operation of the component assembly mechanisms, and in effecting the operation of the assembly mechanism at the various stations only if the baseboards are properly positioned at the respective stations to receive the particular component for which that station is designed. Ordinarily the baseboards employed are of such strength and rigidity that properly aligned and positioned holes or apertures are drilled or otherwise formed in the baseboards prior to the assembly operation for receiving the lead conductors or other supporting elements of the particular components and it will be apparent that operation of the assembly mechanism when the boards are improperly positioned may result in damage to the component, or to the assembly apparatus, or in the improper location of the component on the board. Moreover, even if the baseboards employed are of a character such that predrilled holes or apertures are not required, improper positioning of the boards with respect to the assembly apparatus would result in improper positioning of the components thereby causing improper circuit connections. It is accordingly a further object of the invention to provide an automatic assembly apparatus embodying an automatic transfer and control system in which a plurality of baseboards or panels are automatically moved from one assembly station to the next, in which any desired number of assembly stations may be employed, and in which operation of the assembly mechanisms at the individual stations is prevented unless a baseboard is properly positioned at the station and locked in position so as to receive the particular component which that station is designed to assemble.

In carrying out the invention in one form an apparatus is provided comprising conveyor means for effecting step-by-step movement along a predetermined path of an article adapted to be operated on at one or more stations, which article is provided with accurately located positioning means, together with positioning and locking means effective during the dwell periods between the step-by-step movements to engage and lock the article in proper position relative to an operating station. The conveyor means and the positioning and locking means each include means for controlling the other to effect operation thereof in timed relation and the positioning and locking means include means for controlling the operating mechanisms at the associated station to permit operation thereof only when the article is locked in proper position at that station.

For a more complete understanding of the invention reference should be had to the drawings in which.

Figures 8, 9:
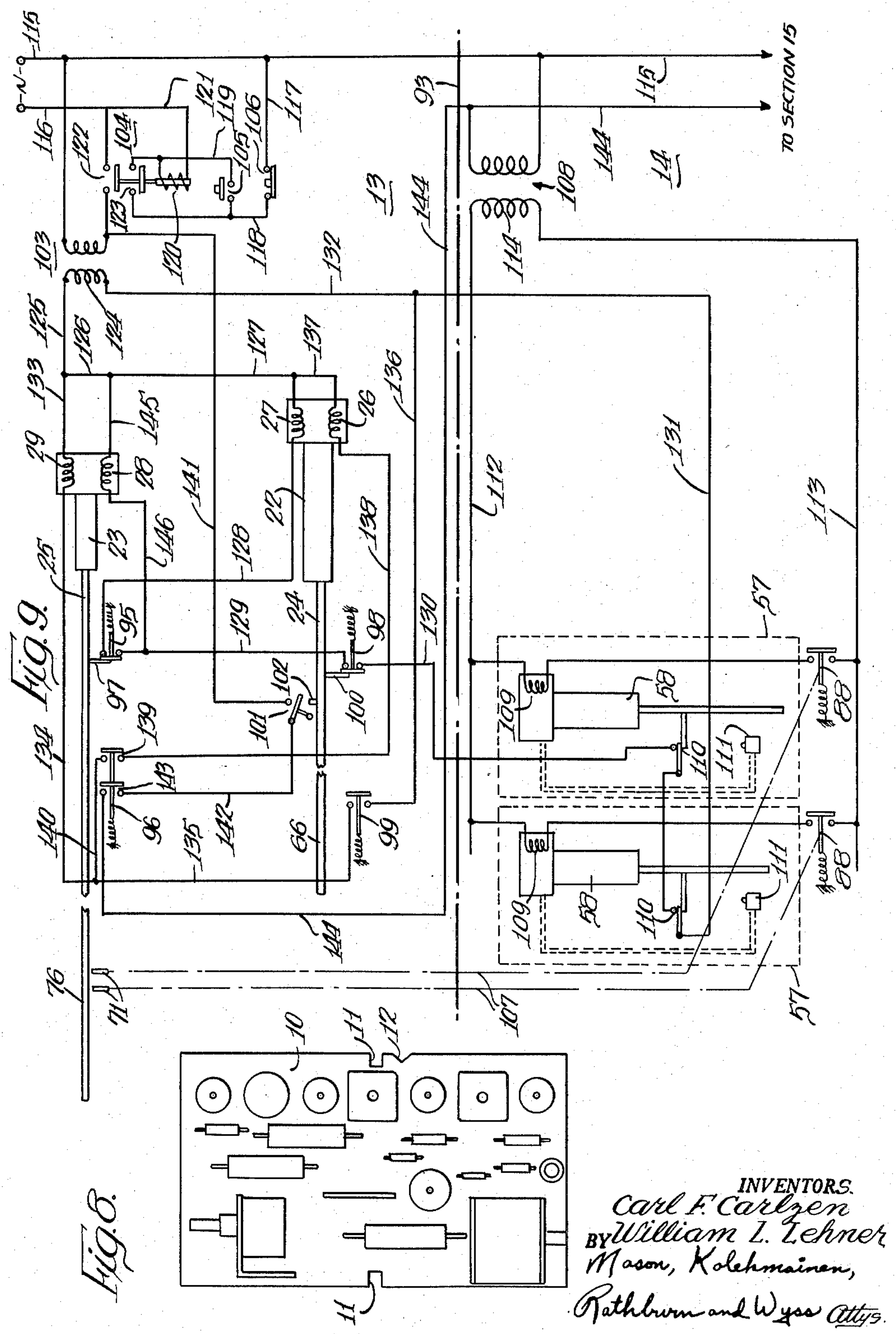
Fig. 8 is a plan view of one form of finished product which may be manufactured or assembled automatically in apparatus embodying the present invention.
Fig. 9 is a circuit diagram of one form of control system embodying the present invention employed in the apparatus of Figs. 1 to 7, inclusive.

Referring now to Fig. 8 of the drawings, the finished article there shown constitutes a chassis portion of a small radio receiver, for example, consisting of a suitable baseboard or panel 10 formed of insulating material for supporting the various components of the receiver such, for example, as resistors, condensers, vacuum tubes, etc. In accordance with the present invention the panels 10 having suitably spaced apertures formed therein for receiving the leads or other supporting members of the various components which boards are fed from a suitable hopper or other supply to the automatic transfer apparatus to be hereinafter described and along which are disposed the necessary number of assembly stations each one of which is arranged to position on and suitably secure to the panel 10 one or more of the various components.

Each of the panels 10 is provided, as shown in Fig. 8, with a pair of rectangular notches 11 located in the opposite side edges of the panel approximately midway between the opposite ends thereof for a purpose to be described hereinafter and with an accurately located V-shaped notch 12 which forms a position determining portion of the panel, and which in cooperation with the apparatus embodying the present invention serves to insure proper positioning of the components on the panel. Although the positioning and locking notch 12 is shown as being formed in the board 10 it will be understood that if desired the boards 10 may be accurately located on and secured to a supporting frame or pallet and the positioning means, whether in the form of a notch or other uniquely constructed portion, may be formed in or on the pallet. Accordingly the term "article having accurately located positioning means thereon" as used in the claims is intended to include either an article such as the board 10 having a notch 12 therein or the combination of a similar board or article and a pallet, which pallet is provided with the positioning means.

Referring now to Figs. 1 to 7, inclusive, of the drawings, the invention is shown as embodied in a transfer apparatus comprising a first, or prime mover, section 13 and a plurality of substantially identical component inserting or assembling sections 14 and 15 any number of which may be provided for operation from the prime mover section. As shown the sections 13, 14 and 15 comprising suitable base plates 16, 17 and 18 respectively adapted to be mounted in end-to-end relation on a framework comprising adjustable upright supports 19 and suitable connecting cross members 20.

Figure 1:
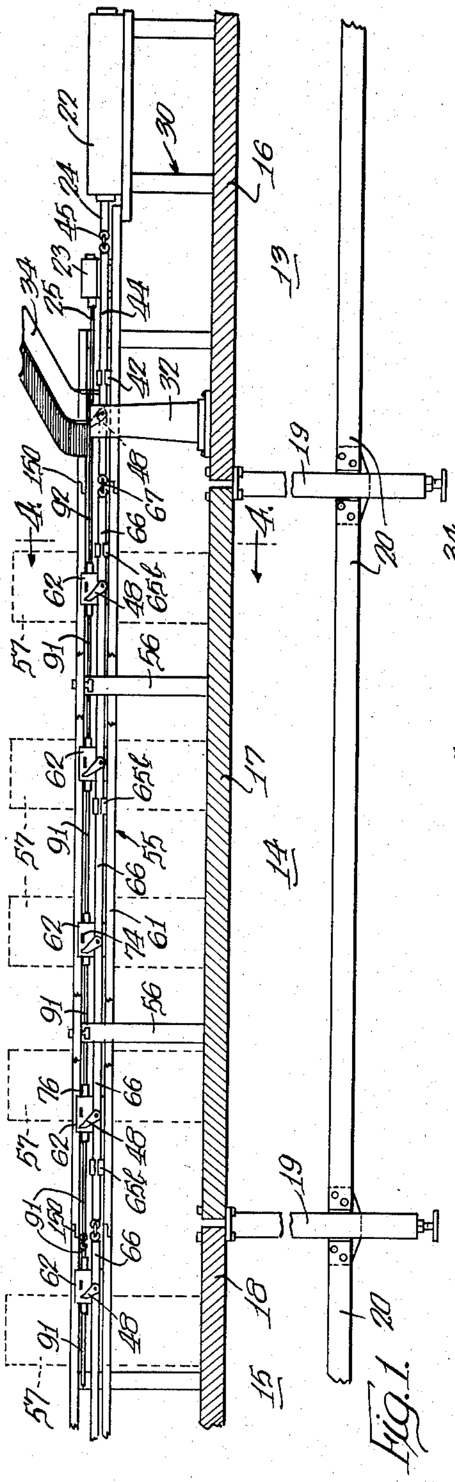
Fig. 1 is a somewhat diagrammatic, elevational view, partly in section, showing a portion of an automatic assembly apparatus embodying the present invention.
Figure 2:
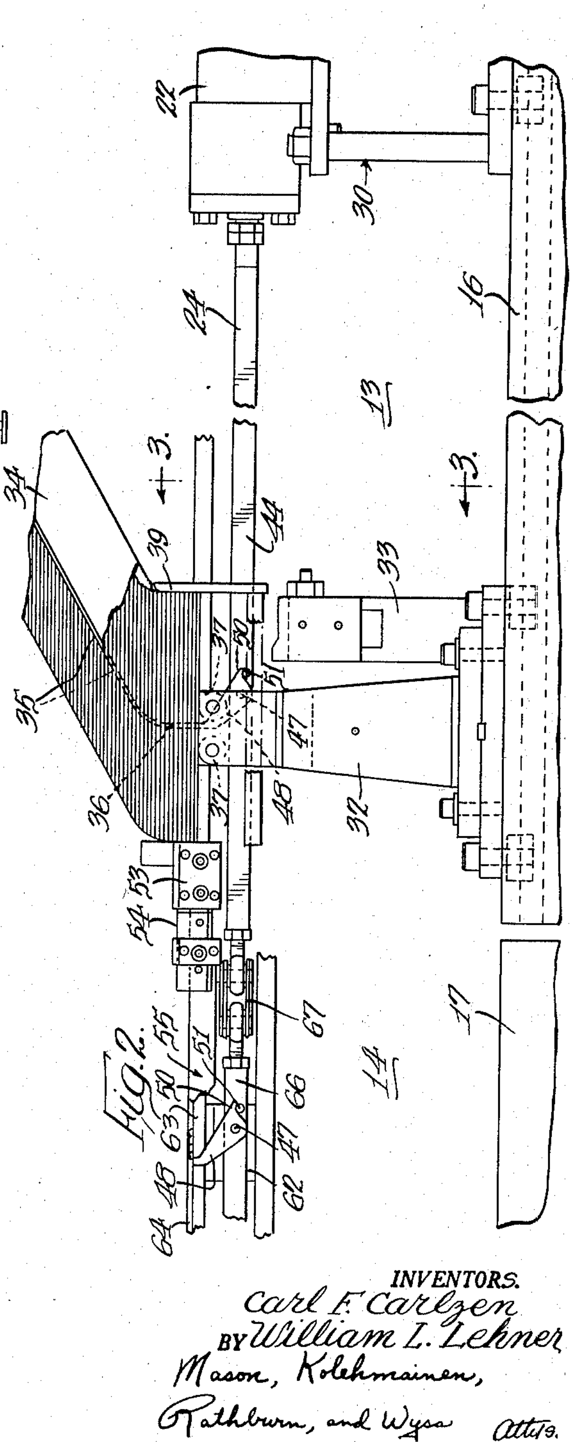
Fig. 2 is an elevational view on a larger scale showing a portion of the apparatus illustrated in Fig. 1.
Figure 3:
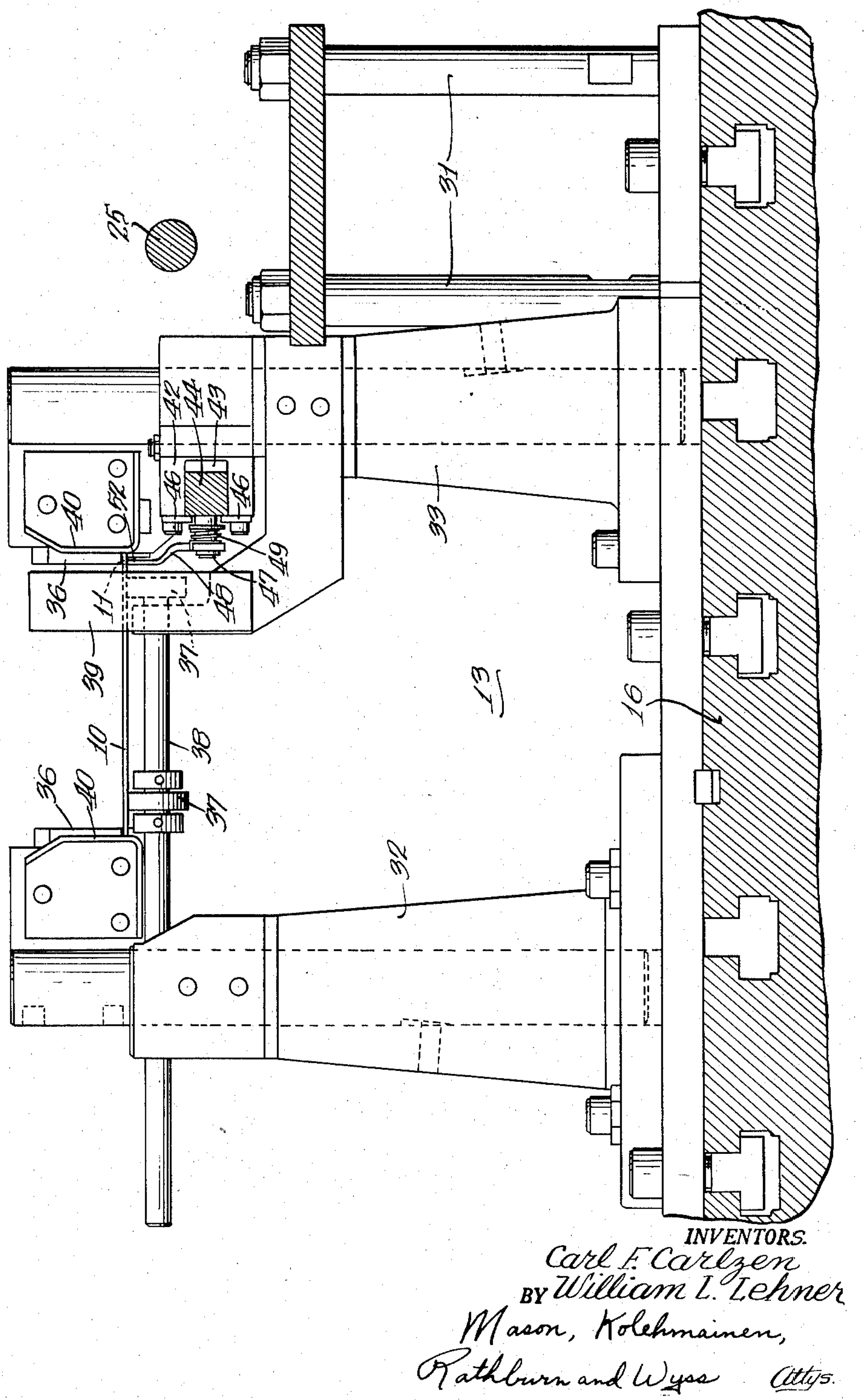
Fig. 3 is an elevational view on a still larger scale partly in section taken along the line 3—3 of Fig. 2.

The section 13, as shown best in Figs. 1 to 3, inclusive, comprises a pair of reciprocating air motors 22 and 23 which may be of any conventional construction but which are indicated diagrammatically in Fig. 9 as including reciprocatable piston rods 24 and 25, respectively, adapted to be operated by suitable pistons under the control of electrically operated advance and retraction valves (not shown), the operating windings of the valves being diagrammatically shown in Fig. 9 and identified by the reference numerals 26, 27, 28 and 29. The air motor 22 is mounted on a suitable support 30 carried by the base plate 16 and the air motor 23 is likewise provided with suitable supporting means 31 (Fig. 3) also carried by the base plate 16.

Forwardly of the air motors 22 and 23 the base plate 16 carries a pair of upright supports 32 and 33 which serve to support a suitable hopper mechanism for automatically feeding the boards or panels 10 to the transfer or conveyor mechanism and while any suitable hopper construction may be employed, an improved hopper mechanism of the type described and claimed in a co-pending application of Carl F. Carlzen Serial No. 501,101 filed April 13, 1955, which application is assigned to the same assignee as the present invention, is illustrated somewhat diagrammatically in the drawings. For the purposes of the present description it is sufficient to state that this hopper mechanism includes an inclined chute structure 34 the opposite sides of which are provided with centrally located guide bars 35, one of which is shown in Fig. 2, which guide bars are adapted to be received in the guide notches 11 in the boards 10 so as to guide the boards properly into a position from which they may be automatically fed to the transfer mechanism. These guide bars 35 terminate immediately above a pair of vertically extending guide bars 36 adapted to be received in the opposed guide notches 11, which vertical guide bars 36 terminate a distance slightly greater than the thickness of the boards 10 immediately above the upper surfaces of a pair of boards supporting rollers 37 which are carried by a suitably journalled rotatable shaft 38 so that the lowermost board in the stack when supported on the rollers 37 is free to move longitudinally forward out of the hopper mechanism and into a suitable guide track which forms part of the conveyor mechanism. A stop plate 39 is provided for preventing rearward movement of the boards and suitable side plates 40 are also provided to prevent twisting of the boards.

As shown best in Fig. 3 the support 33 carries at its upper end a bearing block 42 which is provided with a rectangular groove 43 for slidably receiving a transfer bar section 44 the rear end of which, as shown in Fig. 1, is connected by a suitable connector 45 to the forward end of the piston rod 24. Suitable retainer plates 46, Fig. 3, which are detachably secured to one face of the bearing block 42 and which extend inwardly over the inner side of the guide groove 43 function to retain the transfer bar 44 in the groove and to permit projection from the transfer bar of a pin or shaft 47 which carries at its outer end a pivoted finger 48. Surrounding the shaft 47 is a coil spring 49 which functions to bias the finger 48 for clockwise movement as viewed in Fig. 2 so that a tail piece 50 formed on the rear end of the finger 48 is normally held in engagement with a stop pin 51 carried by the transfer bar 44.

The forward end of the finger 48 is shaped to form a driving and camming tip 52 which, with the parts in positions shown in Figs. 2 and 3, corresponding to the retracted position of the air motor 22, extends upwardly into one of the notches 11 in the lowermost board 10 in the hopper mechanism.

When the air motor 22 is energized to extend the piston rod 24, the tip 52 of the finger 48 will engage the forward edge of the notch 11 and cause the board 10 to move out of the hopper and into a suitable guide track to be hereinafter described which guide track forms a part of the assembly portion 14. Suitably grooved guide members 53 and 54 are provided just forwardly of the hopper mechanism for properly guiding the boards 10 onto this guide track. Upon return movement of the air motor 22 the sloping rear surface of the tip 52 on the finger 48 will engage the rear edge of the notch 11 so as to rotate the finger 48 against the force exerted by the spring 49 and thus the finger 48 will move rearwardly beneath the board 10 that has just been transferred out of the transfer mechanism and beneath the next board that now occupies the lowermost position in the hopper. As soon as the finger 48 reaches the notch 11 in this last mentioned board the spring 49 rotates the finger in a clockwise direction so as to extend the tip 52 into the notch 11 in this board so that upon the next operation of the air motor 22 this next board will be transferred out of the hopper mechanism onto the guide track of the assembly section 14.

Referring now to the assembly sections 14 and 15, only the section 14 will be described in detail since the two sections are identical and as hereinafter indicated any number of additional single sections may be provided. In general the section 14 consists of a guide track indicated generally by the reference numeral 55 which extends over the entire length of the section 14 and is carried on a pair of upright supports 56 secured to the base plate 17. Also mounted on the base plate 17 and disposed in spaced relation along the guide track are a plurality of component positioning and inserting stations 57 which are only diagrammatically indicated in Fig. 1 and which form no part of the present invention except to the extent that the operation thereof is controlled by the board positioning and locking means to be hereinafter described. While any suitable type of component positioning and inserting mechanism having facilities adapted to be thus controlled may be employed, the mechanisms 57, two of which are diagrammatically illustrated in Fig. 9 as including suitable reciprocating air motors 58 and certain control instrumentalities, are of the type described and claimed in a co-pending application Serial No. 443,012, filed July 13, 1954, in the names of the present inventors which application is assigned to the same assignee as the present invention.

Figure 4:
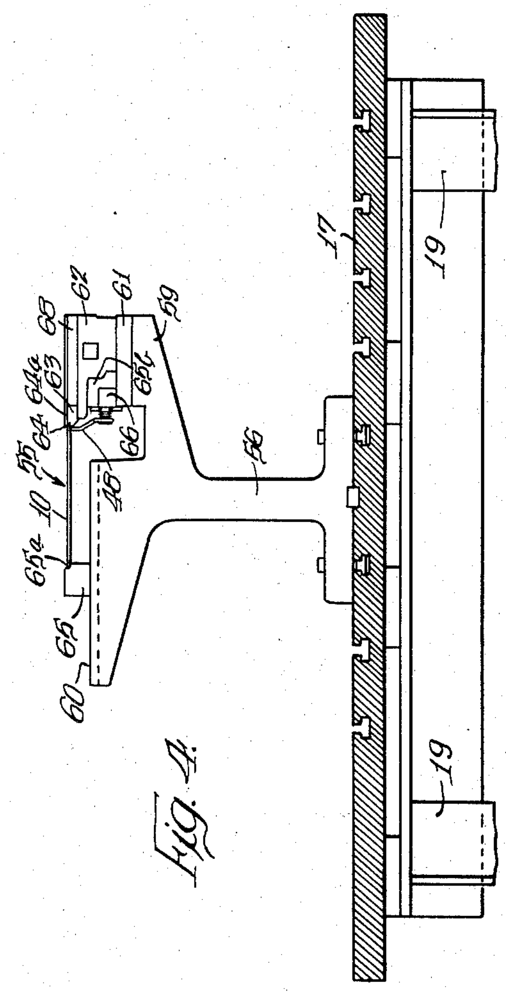
Fig. 4 is a detailed sectional view taken substantially along the line 4—4 of Fig. 1.
Figure 5:
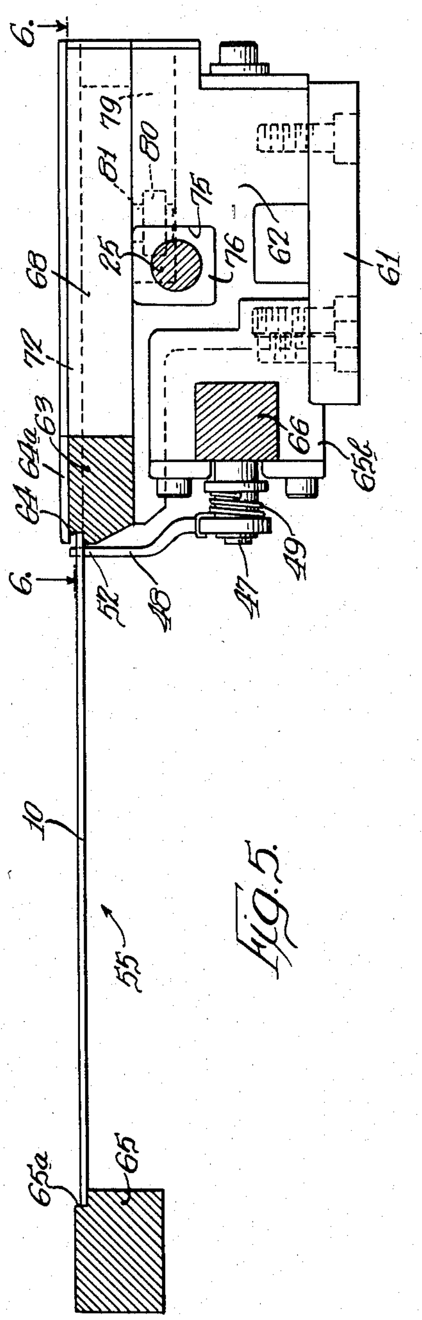
Fig. 5 is a fragmentary detailed sectional view of the upper portion of the apparatus shown in Fig. 4.

As shown best in Figs. 4 and 5 the upright supports 56 are provided with a pair of oppositely extending shelf portions 59 and 60. Secured to the shelf portions 59 and extending throughout the length of the section 14 is a mounting plate 61 which supports a plurality of bearing blocks 62 that in turn support a track member 63 which extends throughout the length of the section 14 and which is provided in its upper, inner corner with a groove 64 for receiving therein one of the edges of the boards 10. A similar track member 65 having a groove 65*a* therein for receiving the opposite edges of the boards 10 is mounted on the shelf portion 60 to provide in co-operation with the track member 63 the heretofore mentioned guide track 55, along which the boards 10 are adapted to be moved from station to station. The track member 65 is preferably laterally adjustable on the shelf 60 to provide for the accommodation of boards of any desired width and a detachable cover member 64*a* is provided which projects outwardly over the groove 64 to prevent upward displacement of the boards 10 from the groove 64 by the spring fingers 48 during portions of the cycle to be hereinafter described.

Also mounted on the plate 61 at suitable intervals are a plurality of bearing blocks 65*b* which are similar in construction to the bearing block 42 in the section 13 and which are adapted to slidingly receive a transfer bar section 66 the rear end of which is detachably connected (Fig. 2) by a suitable connector 67 to the forward end of the transfer bar section 44 for operation therewith by the air motor 22. Carried by and suitably spaced along the transfer bar 66 are a plurality of the spring pressed fingers 48 which are identical with the finger 48 previously described in connection with the prime mover section 13 and the hopper mechanism. These fingers 48 function when the transfer bar 66 is reciprocated to effect step-by-step movement of the boards 10 along the guide track 55 so as sequentially to position each board at the various component inserting stations 57. The fingers 48 on the transfer bar section 66 may be spaced apart a distance equal to the length of the stroke of the air motor 22 so that each board would be engaged by the next forwardly positioned finger on each stroke of the air motor or preferably the fingers 48 may be spaced apart some multiple of this distance in which case the boards intermediate the fingers 48 will be pushed along the guide track 55 by the various other boards that are being engaged and advanced by these fingers.

Figure 6:
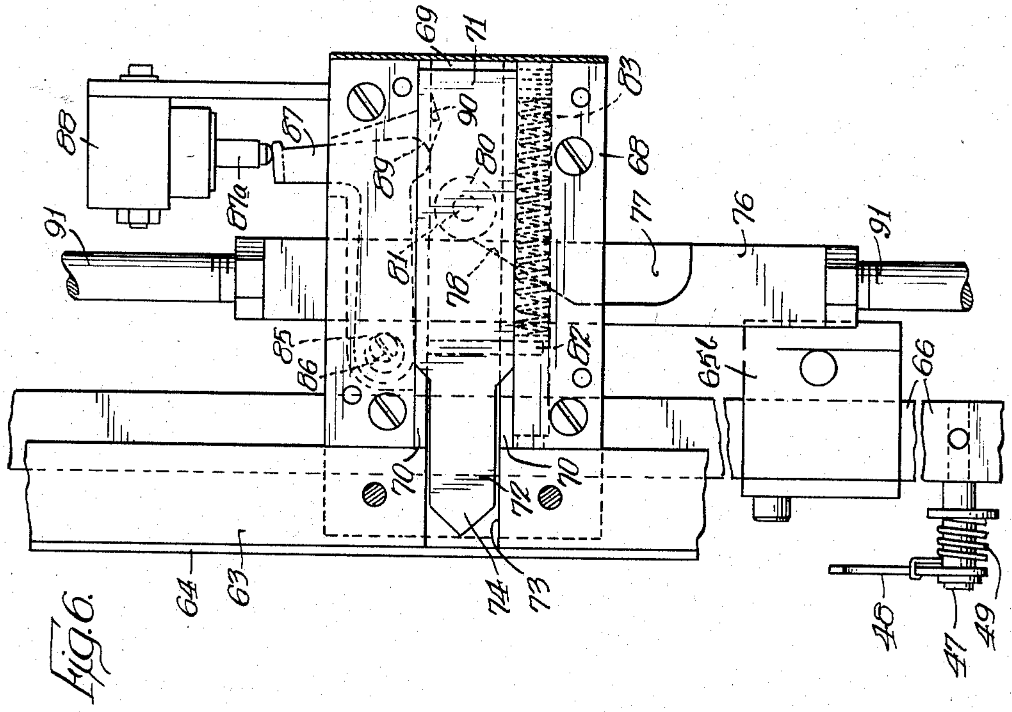
Fig. 6 is a detailed plan view taken substantially along the line 6—6 of Fig. 5 showing the positioning and locking apparatus in one position.
Figure 7:
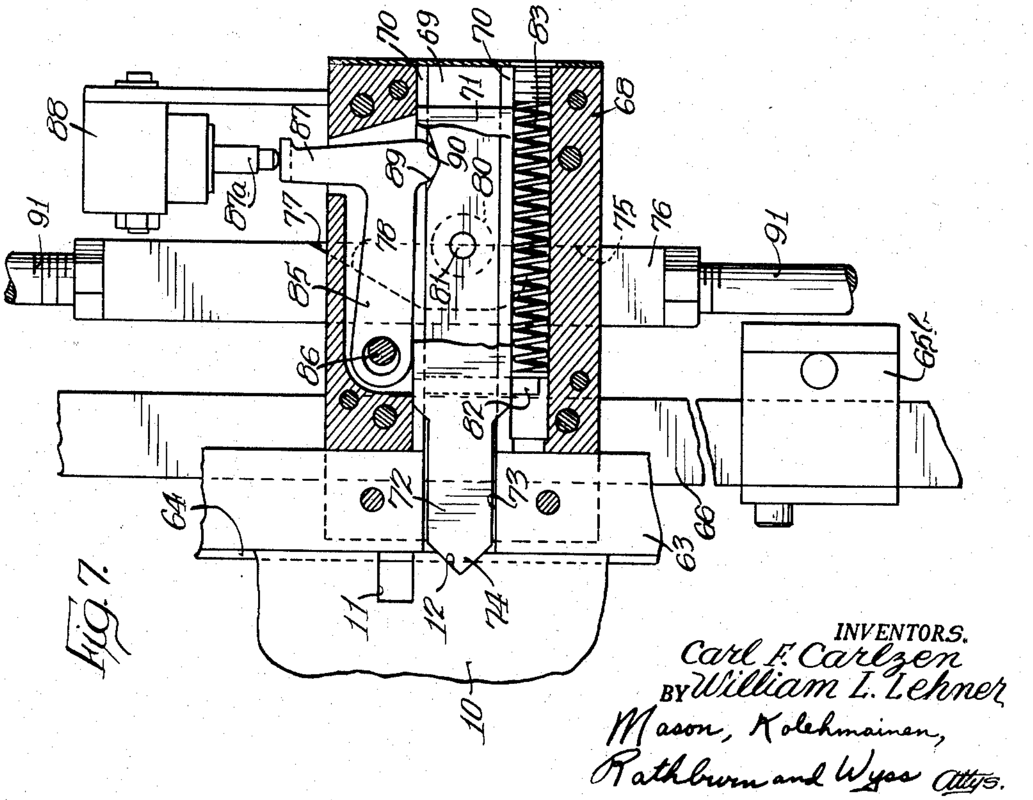
Fig. 7 is a view similar to Fig. 6 but partly in section showing the parts of the positioning and locking apparatus in another position.

As previously indicated, it is essential that the boards 10 be accurately positioned and locked into position relative to the stations 57 before the operating mechanism at the station is energized to insert a component into the board and for this purpose each of the bearing blocks 62, one of which is located at each of the stations 57, is provided with a housing 68 (Figs. 5, 6 and 7) which is formed to provide a transversely extending slot 69 the opposite edges of which provide shoulders 70 for slidably receiving and supporting a positioning and locking pin 71. Adjacent its forward end the pin 71 is provided with a portion 72 of reduced width which extends through an aligned slot 73 in the track member 63 which slot 73 communicates with the board receiving groove 64 in the track member 63. As shown in Figs. 6 and 7 this reduced portion 72 of the pin 71 terminates in a V-shaped end 74 that is adapted as hereinafter explained to enter into the groove 64 to a greater or lesser extent depending upon the presence or absence of one of the boards 10 in the guide track 55 at that particular station and also depends upon whether or not the particular board 10 is so positioned that the end portion 74 on the pin 71 may enter the V-shaped positioning notch 12 formed in the edge of the board.

Immediately below the housing 68 the bearing block 62 is provided with a bearing aperture 75 for slidably supporting a pin controlling bar section 76 which, as shown best in Figs. 6 and 7, is cut away to provide an opening 77 one wall of which is tapered to provide a sloping cam face 78. The bearing block 62 also includes a slot 79 (Fig. 5) which intersects the bearing aperture 75 and is adapted to receive a cam roller 80 mounted on a pin or shaft 81 which extends downwardly from the pin 71 so as to support the roller 80 in the opening 77 in the bar section 76 in a position to be engaged by the sloping cam face 78 upon proper movement of the bar section 76. Extending outwardly from one side of the pin 71 is an arm 82 adapted to be engaged by one end of a suitable compression spring 83, which spring functions to bias the pin 71 for movement from the retracted position shown in Fig. 6 to the extended position shown in Fig. 7 whenever the bar section 76 moves to a position in which the roller 80 may enter the opening 77. It will be observed that when the bar 76 is in the position shown in Fig. 6 the cam roller 80 will be engaged by the outer surface of the bar thereby retaining the pin 71 in its retracted position against the force exerted by the spring 83 and when the bar 76 is moved to the position shown in Fig. 7 the roller 80 is released for movement along the cam face 78 and into the opening 77 thus permitting the spring 83 to move the pin 71 toward its extended position.

Mounted within the housing 68 on the opposite side of the pin 71 from the spring 83 is a bell crank lever 85, one leg of which is pivoted on an eccentrically mounted pivot pin 86 which provides for lateral adjustment of the bell crank relative to the pin 71. The other leg 87 of the bell crank lever 85 extends outwardly of the housing 68 through a suitable opening and is adapted to engage the operating member 87*a* of a normally closed switch 88 and the bell crank lever 85 is provided adjacent the junction point of the legs thereof with an outwardly extending cam portion 89 adapted to engage the adjacent surface of the pin 71 which surface is provided as shown with a cam receiving notch 90. As will be apparent from an inspection of Figs. 6 and 7 when the pin 71 is in the retracted position of Fig. 6 the cam portion 89 on the bell crank lever 85 will be out of engagement with the notch 90 and in this position of the lever 85 the switch 88 will be held in its open circuit position. Upon movement of the pin 71 to the extended position shown in Fig. 7, wherein the pointed end 74 of the pin is engaged in the positioning notch 12 of the board 10 so as to lock the board in proper position in the guide track 55, the cam 89 moves into the notch 90 thus permitting rotation of the bell crank lever 85 in a clockwise direction so as to permit the switch 88 to move to its normal closed position. It will likewise be apparent that if there is no board 10 in the guide track opposite the pin 71 the pin will be moved by the spring 83 to an extreme extended position wherein the roller 80 engages the innermost wall of the opening 77 and the notch 90 in the pin 71 will move past the cam portion 89 so that the cam 89 will engage the outer surface of the pin 71 rearwardly of the notch 90, thus returning the lever 85 to its switch opening position.

In order to provide for simultaneous operation of all of the positioning pins 71 the various pin controlling bar sections 76 are connected together by suitable connecting rods 91 and a similar connecting rod 92 is provided (Fig. 1) for connecting the bar 76 at the end one of the stations 57 to the piston rod 25 of the air motor 23. Furthermore, in order to provide for timed operation of the transfer bar sections 66 and the pin controlling bar section 76, control means are provided which, in addition to the control switches 88 associated with the supporting pins 71, include suitably positioned limit switches adapted to operate by the air motors 22 and 23 at predetermined positions of the piston rods 24 and 25 thereof, which limit switches have not been shown in Figs. 1 to 7, inclusive, but which are diagrammatically shown in Fig. 9 as being operated by suitable switch operating arms carried by the piston rods 24 and 25.

In Fig. 9 the control system is shown for only the prime mover section 13 and the first assembly section 14, the equipment for section 13 being shown above, and the equipment for section 14 being shown below, the broken line 93, but it will be understood that the control equipment and the connections for the assembly section 15 and any additional assembly sections that may be required will constitute a mere duplication of the equipment employed in section 14.

Referring now specifically to Fig. 9, the section 13 includes in addition to the transfer air motor 22 and the positioning pin air motor 23 a normally open single pole limit switch 95 and a normally open double pole limit switch 96 associated with the piston rod 25 of the air motor 23 for closure thereby when the piston rod is in its retracted and extended positions respectively, an arm 97 extending from the rod 25 being shown as diagrammatically representative of the switch operating element or elements carried by the piston rod; a pair of normally open single pole limit switches 98 and 99 respectively adapted to be closed when the piston rod 24 of the air motor 22 is in its retracted and extended positions, the operating mechanism therefore being diagrammatically illustrated by the arm 100 extending from the rod 24; a normally open trigger switch 101 arranged to be momentarily closed at a predetermined point in the movement of the piston rod 24 from its extended to its retracted position the operating mechanism for the trigger switch being diagrammatically illustrated as a finger 102 carried by the piston rod 24; a step-down transformer 103; a starting relay 104; a start button 105 and a stop button 106.

The assembly section 14, as shown in Fig. 9, in addition to the component inserting stations 57, only two of which are shown, and the pin operated control switches 88, the operating connection between the switches 88 and the positioning and locking pins 71 being represented by the broken lines 107, includes a transformer 108. Each of the stations 57 as previously indicated includes an air motor 58 and each air motor comprises an electromagnetic advance valve represented by a winding 109; an up-position limit switch 110, adapted to be closed when the air motor is in its retracted position, and a suitable poppet valve 111 adapted to be closed when the air motor reaches its extended position for automatically effecting return movement of the air motor. It will be observed that the windings 109 are connected in parallel across the conductors 112 and 113 extending from the secondary winding 114 of the transformer 108, each of the windings 109 being in series with the associated control switch 88, and it will be understood that any additional stations 57 and pin control switches 88 as are desired may be similarly connected across the secondary winding 114.

With the foregoing description of the various portions of the equipment in mind, it is believed that a complete understanding of the invention will be had from a description of its operation. Referring specifically to Fig. 9 wherein the various elements are shown in the respective positions occupied when all of the air motors 22, 23 and 58 are in their respective retracted position, it will first be assumed that the hopper is loaded with a supply of the boards 10 but that no boards have been advanced into the guide track 55 of the section 14. In order to initiate operation of the system it is only necessary to close momentarily the start button 105 to establish an energizing circuit for the relay 104 which circuit may be traced from the power conductor 115, which together with the power conductor 116 is connected to a suitable source of alternating current power, through a conductor 117, the stop button 106; a conductor 118, a start button 105, a conductor 119, the energizing winding 120 of the relay 104 and by way of a conductor 121 to the power conductor 116. Energization of the winding 120 of the relay 104 results in closure of the relay contacts 122 and 123 so as to energize the primary winding of the transformer 103 through the contacts 122 and to establish through the contacts 123 the usual holding circuit for the winding 120 in parallel with the start button 105.

Upon energization of the transformer 103 the forward valve winding 27 of the air motor 22 is energized through a circuit which may be traced from the upper terminal of the secondary winding 124 of the transformer 103 through the conductors 125, 126, and 127, the valve winding 27, a conductor 128, the limit switch 95, which is held closed by the air motor 23, a conductor 129, the limit switch 98 which is held closed by the air motor 22, a conductor 130, the up-position switches 110 on the air motors 58 at the stations 57 and by way of the conductors 131 and 132 to the lower terminal of the secondary winding 124. Energization of the valve winding 27 effects forward movement of the air motor 22 and advances the transfer bar sections 44 and 46 at the sections 13 and 14 which causes the finger 48 in the section 13 to move the lowermost board out of the hopper and on to the guide track 55 as previously described.

As soon as the air motor 22 leaves its retracted position the limit switch 98 will open to interrupt the previously described energized circuit for the winding 27, but the air motor 22 will continue its forward movement since the various air motors are of the well known type requiring only a momentary energization of the valve winding after which the air flow to the cylinder continues in the same direction until a reverse signal is applied. When the air motor 22 reaches the forward end of its board-advancing stroke the arm 100 on the piston rod 24 closes the limit switch 99 to complete an energization circuit for the forward valve winding 29 of the positioning pin air motor 23, which circuit may be traced from the secondary winding 124 through the conductors 125 and 133, the valve winding 29, the conductors 134 and 135, the limit switch 99 and by way of the conductors 136 and 132 to the other side of the secondary winding 124.

The consequent movement of the air cylinder 23 toward forward position operates the pin controlling bars 76 at the various operating stations so as to release the cam rollers 80 for movement into the openings 77 in the bars 76 thus permitting extension of the pins 71 from the retracted position shown in Fig. 6. Since at this stage of the operation only one board has been advanced from the hopper there will be no boards in the guide track at the stations 57, and, consequently, the pins 71 will move quickly through the switch closing positions shown in Fig. 7 to their extreme extended positions in which the notches 90 have passed over the cam portions 89 so as to cause momentary closure and immediate reopening of the switches 88. This momentary closure of the switches 88 does not effect operation of the air motors 58 at the stations 57 due to the fact that the transformer 108 at section 14 is not energized.

Also when the air cylinder 23 reaches its forward position closure of the double pole limit switch 96 is effected to complete and to partially complete additional circuits. Thus, the righthand contacts 139 on the limit switch 96 complete an energization circuit for the reverse valve winding 26 on the air motor 22 which circuit may be traced from the secondary winding 124 through the conductors 125, 126, 127 and 137, the valve winding 26, a conductor 138, the contacts 139 on the limit switch 96, the conductors 140 and 135, the limit switch 99 which is still being held closed by the air motor 22 and by way of the conductors 136 and 132 to the other terminal of the secondary winding. The completion of this circuit initiates reverse movement of the air motor 22 to return the transfer bar sections 44 and 66 and the spring fingers 48 to their retracted positions. In addition to the above-described circuit an energizing circuit for the primary winding for the transformer 108 at the assembly station 14 is partially completed. This circuit may be traced from the power conductor 116 through the contacts 122 of the relay 104 and a conductor 141 to one side of the trigger switch 101, and from the other side of the trigger switch the circuit is completed through a conductor 142, the lefthand contacts 143 of the limit switch 96, a conductor 144 and the primary winding of the transformer 108 to the other power conductor 115. Since the trigger switch 101 is open when the air motor 22 is in its forward position, the transformer 108 will not be immediately energized but just before the air motor 22 reaches its retracted position the trigger switch 101 will be closed to energize the transformer 108. However, since there are no boards in proper position at the station 58, the pin controlled switches 88 at the stations 57 are open, and operation of the air motors 58 is not effected.

When the air motor 22 reaches its retracted position reclosure of the limit switch 98 is effected to complete an energizing circuit for the return valve winding 28 of the pin controlling air motor 23, which circuit may be traced from the upper terminal of the secondary winding 124 through the conductors 125, 126 and 145, the valve winding 28, the conductors 146 and 129, the limit switch 98, the conductor 130, the up-position switches 110 at the stations 57 and, by way of the conductors 131 and 132, to the lower terminal of the secondary winding. It will thus be seen that the valve winding 28 is not energized to effect return movement of the air motor 23 until all of the air motors 58 at the stations 57 are in their up-positions. Return of the air motor 23 to its retracted position recloses the limit switch 95 to reestablish the initial energizing circuit for the forward valve winding 27 of the air motor 22 whereupon the above-described cycle of operations will be repeated to advance another one of the boards 10 from the hopper mechanism and to advance the first board along the guide track 55 as previously described.

Assuming now that the cycle has been repeated a sufficient number of times to position a pair of the boards 10 in the guide track 55 opposite each of the stations 57 shown in Fig. 9, it will be understood that when the positioning and locking pins 71 are released by forward movement of the pin controlling bars 76, the pins 71 will be urged outwardly so that the V-shaped ends 74 thereof will engage the edges of the adjacent boards. If the boards are sufficiently close to their respective proper positions at the stations 57 to permit the pointed ends 74 or the positioning pins 71 to enter the V-shaped notches 12 in the boards, at least partially, the pins 71 will effect such additional movement of the boards as may be necessary to center the notches 12 on the pins thus positively locking the boards in accurately determined position for the insertion of components thereon and, the pin 71 being in the position shown in Fig. 7, the switches 88 will close.

With the switches 88 closed, operation of the trigger switch 101 during return movement of the air motor 22 so as to energize the primary winding of the transformer 108 at the section 14 will effect energization of all of the valve windings 109 on the air motors 58 at the stations 57 whereupon the component inserting mechanisms will be operated to carry out their particular functions and upon completion of the downward strokes of the air motors 58 the various control valves 111 will be operated to return the air motors automatically to their uppermost positions thereby closing the up-position switches 110 to permit energization of the return valve winding 28 on the air motor 23 in order to complete the cycle as above described.

It will be apparent from the above description that if a board is positioned so improperly in the guide track 55 opposite any particular one of the stations 57 that the positioning pin 71 at that station when released cannot enter the positioning notch 12 so as accurately to position and lock the board, the pin 71 will not move from the retracted position in Fig. 7 even though released by the control bar 76. Consequently, the associated switch 88 will not be closed and that particular station will not be energized to carry out a component inserting operation. The primary cycle, however, will be completed and the boards will be moved to a succeeding station along the guide track 55 the result being that the particular board which was out of position will be missing one component which may later be added by hand or if desired that particular board may be removed from the guide track for rejection.

As has been previously indicated any desired number of additional sections, such as the section 15, may be added merely by mounting the additional sections in proper alignment to extend the guide track 55, the track members 63 and 65 having properly shaped ends to permit ready connection as indicated by the reference numeral 150 in Fig. 1, by properly connecting the transfer bars 66 and the connecting rods 91 which extend from the pin controlling bars 76 at the adjacent ends of the sections and by extending the electrical and air connections to provide for operation of the stations 57 on the additional sections each of which is provided with an energizing transformer corresponding to the transformer 108 of the section 14. The air connections simply include an air pressure supply conduit for operation of the air motors 58 at the additional sections and the electrical connections comprise merely an extension of the conductors 115 and 144 for connecting the additional transformers 108 in parallel and a pair of conductors for inserting the up-position switches on the air motors of the additional sections in series with the up-position switches 110 of the section 14.

Although the conveyor means for effecting step-by-step movement of the boards 10 between the stations 57 has been shown and described as comprising the reciprocating air motor 23 for advancing and retracting the finger carrying transfer bar sections 66 it will be understood that any suitable conveyor means may be employed which is effective to advance the boards from one station to the next and to provide a dwell period at the stations during which the boards may be locked in accurately positioned relation for the reception of a particular component.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. Apparatus for sequentially transferring to a plurality of stations, each of which includes a mechanism for performing a particular operation, a plurality of articles having accurately located positioning means thereon, said apparatus comprising conveyor means for effecting step-by-step movement of said articles in a path along which a plurality of said stations are positioned, positioning and locking means adjacent each of said stations for engaging said positioning means on said articles upon movement of said articles to said stations to lock said articles in proper predetermined positions at said stations, and interlock means at each station for selectively preventing the operation of the respective mechanism if the article at the respective station is improperly positioned and for permitting the operation of the ones of said mechanisms located at those stations at which the articles are properly positioned.

2. In a transfer apparatus for conveying a plurality of articles to a plurality of work stations wherein each of said articles is provided thereon with an accurately located positioning means, a plurality of positioning and locking mechanisms each comprising a positioning pin for selectively engaging said positioning means on said article, spring means acting on said pins to urge them into engagement with said positioning means, a movable cam member, a cam follower mounted on said pin for movement by said cam member to move said pin against the force exerted thereon by said spring, and hydraulically operated means for controlling the movement of said cam member.

3. In apparatus of the type described, the combination of conveyor means for moving a plurality of articles along a predetermined path, a plurality of positioning and locking means spatially arranged along said path for selective engagement with said articles, spring means associated with each of said positioning and locking means for urging said positioning and locking means toward an engaging position with said articles, and hydraulically controlled means for acting on said positioning and locking means in opposition to the force exerted thereon by said spring means to move said positioning and locking means out of engagement with said article.

4. Transfer apparatus for conveying a plurality of articles to a plurality of work stations, each of said stations being provided with a mechanism for performing certain operations on said article, said transfer apparatus comprising movable means for engaging said articles to move them from one station to the next, positioning means at each of said stations including an article engaging structure for accurately locating each respective article in a predetermined position relative to said station, and means responsive to two conditions relative to the respective article being located at a respective station to energize the mechanism provided at the respective station, one of said conditions being that an article be present at the station and the other condition being that the article so present is located in a predetermined position at the station.

5. In apparatus for performing a number of different operations on a plurality of articles, which apparatus includes a plurality of spatially disposed stations at each of which is provided a mechanism for performing at least one of said operations, the combination of a conveyor for moving said articles to each of said stations, a plurality of indexing pins respectively located at said stations and longitudinally biased into article engaging positions, each of said pins having a cam surface thereon, and cam follower means at each of said stations for controlling the operation of the associated one of said mechanisms, each of said cam surfaces and associated cam follower being relatively positioned to effect operation of the associated one of said mechanisms only when said pin engages a predetermined portion of the article positioned at the respective station.

6. The combination set forth in claim 5 wherein each of said cam surfaces comprises an irregularity in the surface of the respective pin intermediate the longitudinal ends thereof, whereby said cam follower means renders the associated mechanism operative only when said pin is moved a predetermined distance toward said article.

7. The combination set forth in claim 6 wherein said pins are spring biased into an article engaging position, means synchronously operated with said conveyor is provided for periodically moving said pins out of article engaging position, and said irregularity comprises a recess.

References Cited in the file of this patent

UNITED STATES PATENTS

| | | |
|---|---|---|
| 2,053,400 | Kingsbury | Sept. 8, 1936 |
| 2,193,840 | Oberhoffen | Mar. 19, 1940 |
| 2,238,921 | Waldsmith | Apr. 22, 1941 |
| 2,249,230 | Schafer | July 15, 1941 |
| 2,302,878 | Muhl | Nov. 24, 1942 |
| 2,559,369 | Phillips | July 3, 1951 |
| 2,693,,843 | Magnas et al. | Nov. 1, 1954 |
| 2,769,228 | Burge | Nov. 6, 1956 |